United States Patent
Radhakrishnan et al.

(10) Patent No.: US 8,489,786 B2
(45) Date of Patent: Jul. 16, 2013

(54) ACKNOWLEDGEMENT MANAGEMENT TECHNIQUE FOR SUPPORTED COMMAND SET OF SMBUS/PMBUS SLAVE APPLICATIONS

(75) Inventors: Hariharasudhan Kalayamputhur Radhakrishnan, Tamil Nadu (IN); Anand Kumar Swami, Rajasthan (IN)

(73) Assignee: STMicroelectronics International N.V., Amsterdam (NL)

( * ) Notice: Subject to any disclaimer, the term of this patent is extended or adjusted under 35 U.S.C. 154(b) by 655 days.

(21) Appl. No.: 12/615,015

(22) Filed: Nov. 9, 2009

(65) Prior Publication Data

US 2011/0113171 A1    May 12, 2011

(51) Int. Cl.
*G06F 13/00*   (2006.01)
*G06F 3/00*    (2006.01)

(52) U.S. Cl.
USPC ............................................ 710/110; 710/10

(58) Field of Classification Search
USPC .................................................. 710/110, 10
See application file for complete search history.

(56) References Cited

U.S. PATENT DOCUMENTS

| | | | |
|---|---|---|---|
| 6,209,022 B1 * | 3/2001 | Sotek et al. ................... | 709/209 |
| 6,874,047 B1 * | 3/2005 | Duguay et al. ................ | 710/100 |
| 7,366,809 B2 * | 4/2008 | Saripalli et al. .............. | 710/110 |
| 7,380,042 B2 * | 5/2008 | Wang et al. ................... | 710/305 |
| 7,631,110 B2 * | 12/2009 | Berenbaum et al. ............. | 710/9 |
| 7,668,977 B2 * | 2/2010 | Krueger et al. ................ | 710/10 |
| 7,774,528 B2 * | 8/2010 | Deshpande et al. ........... | 710/106 |
| 7,818,604 B2 * | 10/2010 | Saripalli et al. .............. | 713/600 |
| 7,840,734 B2 * | 11/2010 | Murfett et al. ................ | 710/106 |
| 2007/0294443 A1 * | 12/2007 | Berenbaum et al. ........... | 710/104 |
| 2008/0147941 A1 * | 6/2008 | Deshpande et al. ........... | 710/110 |
| 2008/0189458 A1 * | 8/2008 | Deshpande et al. ........... | 710/110 |

OTHER PUBLICATIONS

Forum5, SMBus Slave Interrupts, Feb. 5, 2008, http://www.cygnal.org/ubb/forum5/HTML/001170.html.*
Harman Grewal, Implementing SMBus Using MSP430 Hardware I2C, Apr. 5, 2005.*
System Management Bus (SMBus) Specification, Aug. 3, 2000, SBS Implementers Forum.*
SMI System Management Interface Forum, "PMBus Power System Management Protocol Specification, Part I—General Requirements, Transport and Electrical Interface", Revision 1.1., Feb. 5, 2007, www.powerSIG.org, pp. 1-19.
System Management Interface Forum, "PMBus Power System Management Protocol Specification, Part II—Command Language", Revision 1.1, Feb. 5, 2007, www.powerSIG.org, pp. 1-98.
SBS Implementers Forum, System Management Bus (SMBus) Specification, Version 2.0, Aug. 3, 2000, pp. 1-59.

* cited by examiner

*Primary Examiner* — Paul R Myers
*Assistant Examiner* — Christopher A Daley
(74) *Attorney, Agent, or Firm* — Gardere Wynne Sewell LLP

(57) ABSTRACT

A slave device has an input/output adapted for connection to a serial data line of an I²C bus configuration, a clock input adapted for connection to a serial clock line of the I²C bus configuration, and an interrupt input adapted for connection to the serial clock line of the I²C bus configuration. The slave device senses transitions on the serial clock line through the interrupt input to trigger capturing of a command code on serial data line through the input output. In response to receipt of the command code, the slave device controls the serial data line through the input/output to send an acknowledgement of receipt of the command code. However, if the captured command code is not recognized the slave device inhibits sending of the acknowledgement of the command code. The pull up connection on the serial data line of the I²C bus configuration will, when the slave device is inhibited from acknowledging, produce a high logic state indicative of a no acknowledgement.

19 Claims, 4 Drawing Sheets

ACKNOWLEDGEMENT MANAGEMENT TECHNIQUE FOR SUPPORTED COMMAND SET OF SMBUS/PMBUS SLAVE APPLICATIONS

BACKGROUND OF THE INVENTION

1. Technical Field of the Invention

The present invention relates to acknowledging commands in a system/power management bus environment and, more specifically, to the acknowledgement of unsupported command codes by a slave device.

2. Description of Related Art

The System Management Bus (SMBus) is a bus defined by Intel in 1995. The SMBus is primarily used in personal computers and servers for low-speed system management communications. See, "System Management Bus (SMBus) Specification", Version 2.0, dated Aug. 3, 2000, the disclosure of which is hereby incorporated by reference.

The Power Management Bus (PMBus) is a bus defined in accordance with an open standard power-management protocol. The protocol supports a fully defined command language that facilitates communication with power converters and other devices in a power system. See, "PMBus Power System Management Protocol Specification Part I—General Requirements, Transport and Electrical Interface" Revision 1.1, Feb. 5, 2007, the disclosure of which is hereby incorporated by reference. See, also, "PMBus Power System Management Protocol Specification Part II—Command Language" Revision 1.1, Feb. 5, 2007, the disclosure of which is hereby incorporated by reference.

Reference is now made to FIG. 1 which shows a block diagram of the interconnection of a system host/bus master 10 with a slave unit 12 through a Power Management Bus (PMBus). The slave unit 12 will typically comprise a power conversion device or a power system device. The system host/bus master 10 includes an input 14 connected to an alert signal line 16. The slave unit 12 includes an output 18 which is connected to the alert signal line 16. The slave unit 12 can use the alert signal line to issue an alert signal (for example, through a logic state change) indicating the signaling of an alert condition. The system host/bus master 10 includes an output 20 connected to a control signal line 22. The slave unit 12 includes an input 24 which is connected to the control signal line 22. The control signal line 22 carries a control signal output from the system host/bus master 10 so as to turn the slave unit 12 on and off in conjunction with the issuance of commands by the system host/bus master 10). The system host/bus master 10 further includes an output 26 connected to a clock signal line 28. The slave unit 12 includes an input 30 which is connected to the clock signal line 28. The clock signal line 28 carries the clock signal generated by the system host/bus master 10 which governs timing of operations on the PMBus. The system host/bus master 10 also includes a serial input/output 30 connected to a bi-directional serial data bus 32. The slave unit 12 includes a serial input/output 34 which is connected to the bi-directional serial data bus 32. The serial data bus 32 carries bus communications (such as commands and data issued by the system host/bus master 10 or data originating at the slave unit 12) between the system host/bus master 10 and the slave unit 12. The slave unit 12 further receives address programming data (specifying the particular address of the slave unit) and a write protect signal (which is optional for controlling the updating of internal memory within the slave unit 12). Although only one slave unit 12 is shown in FIG. 1, it will be understood by those skilled in the art that the PMBus supports the connection of multiple slave units to the system host/bus master 10, and furthermore more than one bus master 10 may be connected.

Reference is now made to FIG. 2 which shows an exemplary communication between the system host/bus master 10 and the slave unit 12 over the serial data bus 32. In FIG. 2, an open box 50 indicates a master-to-slave serial communication over the bi-directional serial data bus 32 while a shaded box 52 indicates a slave-to-master communication over the bi-directional serial data bus 32. The illustrated serial communication in FIG. 2 is read from left to right. Thus, the master 10 sends a first bit S indicating a "start condition" over the serial data bus 32. The master 10 than sends a seven bit address of the slave 12 to which the master's communication is addressed followed by a one bit Wr indicating a "write" operation (or Wr(bar) indicating a "read" operation) to be performed with respect to the slave 12. The addressed slave 12 responds to the communicated eight bits (address plus Wr) with a one bit A signal indicating an acknowledgement (ACK) of receipt. The master 10 then sends an eight bit command code to the slave 12 instructing the performance of a certain operation by the slave 12. The previously addressed slave responds to the communicated eight bits of command data with a one bit A signal indicating an acknowledgement (ACK) of receipt. The master 10 may then send, for example, an eight bit data byte. The previously addressed slave responds to the communicated eight bits of data with a one bit A signal indicating an acknowledgement (ACK) of receipt. The master 10 then sends a one bit P signal indicating a stop condition. It will be noted that the master-to-slave communication begins with a start S bit and ends with a stop P bit. Additionally, for every successfully received byte (eight bits) the slave 12 responds with a one bit A acknowledgement. Although not shown in FIG. 2, should the slave 12 send eight bits of data to the master 10 (which are successfully received), the master 10 will likewise respond with a one bit A acknowledgement.

One question concerns what should be done by the slave 12 when the eight bit command code sent by the master 10 is not supported by the slave 12? In accordance with the SMBus standard, the slave 12 should send a one bit A(bar) signal indicating no acknowledgement (NACK) of receipt (see, "System Management Bus (SMBus) Specification", Version 2.0, Section 5.5). In accordance with the PMBus standard, the slave 12 may either a) send a one bit A(bar) signal indicating no acknowledgement (NACK) of receipt (see, "PMBus Power System Management Protocol Specification Part II—Command Language" Revision 1.1, Section 10.9.2), or b) send a one bit A signal indicating an acknowledgement (ACK) of receipt followed by a notification to the master 10 through an Alert Signal indicating that the command which was previously sent is not supported by the slave 12 (see, "PMBus Power System Management Protocol Specification Part II—Command Language" Revision 1.1, Sections 10.2.2 and 10.6).

It is known in the art to provide a bus communication between master and slave which is not fully hardware compatible with the SMBus/PMBus specification. For example, it is possible to have a master and slave interconnected by an I²C bus. FIG. 3 illustrates a conventional I²C bus configuration with respect to a master device 10 and several slave devices 12. The conventional I²C bus configuration uses two open-drain lines, the Serial Data (SDA) line and the Serial Clock (SCL) line, pulled up with resistors to a supply voltage Vdd.

In the I²C bus configuration, the master 10 is a node that issues the clock and addresses the slaves. Each slave 12 is a node that receives the clock and the address from the master 10. The master 10 is initially in master transmit mode by sending a start bit followed by the seven-bit address of the slave 12 to which it wishes to communicate. This is followed by a single bit representing whether the master 10 wishes to write to or read from the slave. If the addressed slave 12 exists on the bus, the slave responds with a one bit acknowledgement (active low for acknowledged). The master then continues in either transmit or receive mode (according to the read/write bit it sent), and the slave continues in its complementary mode (receive or transmit, respectively). This I²C bus protocol is very similar to that shown in FIG. 2 for SMBus/PMBus operation.

Referring again to the issue of what should be done by the slave 12 when the eight bit command code sent by the master 10 is not supported by the slave 12, those skilled in the art will recognize that the current I²C bus protocol does not permit sending a one bit A(bar) signal indicating no acknowledgement (NACK) of receipt when the command is not supported. Thus, in an I²C bus configuration, in support of the SMBus/PMBus specification, the slave must choose option b) and send a one bit A signal indicating an acknowledgement (ACK) of receipt followed by a notification to the master 10 indicating that the command which was previously sent is not supported by the slave 12. To accomplish this, the I²C bus configuration must further include an alert signal line (ALERT), similar to the alert signal line 16 of FIG. 1, to allow the slave 12 to issue the notification to the master 10. However, the SMBus/PMBus specification specifically teaches that the alert signal line 16 of FIG. 1 is optional, and thus those skilled in the art will often not include the ALERT line in an I²C bus configuration like that of FIG. 3.

A need accordingly exists for a way to have a slave 12 issue a notification to the master 10 in a conventional I²C bus configuration that the received command which was previously sent by the master 10 is not supported by the slave 12. More specifically, there is a need to support the slave-to-master notification of no support for the issued command without requiring the presence of the optional ALERT signal line in the I²C bus configuration.

SUMMARY OF THE INVENTION

In an embodiment, a method for use with an I²C bus configuration comprises: receiving by a slave device of a command code communicated over a serial data line of the I²C bus configuration; determining by the slave device whether the received command code is one of plurality of supported command codes; if yes, driving the serial data line of the I²C bus configuration to a logic low state indicative of an acknowledgement of the command code; and if no, inhibiting driving of the serial data line of the I²C bus configuration to the logic low state so as to indicate a no acknowledgement of the command code.

In an embodiment, a method for use with an I²C bus configuration comprises: (a) sensing transition of a serial clock line of the I²C bus configuration; (b) capturing a bit of a command code present on a serial data line of the I²C bus configuration; (c) repeating (a) and (b) until all bits of the command code are captured; (d) determining whether the received command code is one of plurality of supported command codes; and (e1) if yes, sending an acknowledgement of the command code; or (e2) if no, inhibiting sending of the acknowledgement of the command code.

In an embodiment, an apparatus comprises: a slave device having an input/output adapted for connection to a serial data line of an I²C bus configuration, a clock input adapted for connection to a serial clock line of the I²C bus configuration, and an interrupt input adapted for connection to the serial clock line of the I²C bus configuration. The slave device senses transitions on the serial clock line through the interrupt input to trigger capturing of a command code on serial data line through the input output and controls the serial data line through the input/output to send an acknowledgement of receipt of the command code. However, the slave device inhibits sending of the acknowledgement of the command code if the captured command code is not recognized.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
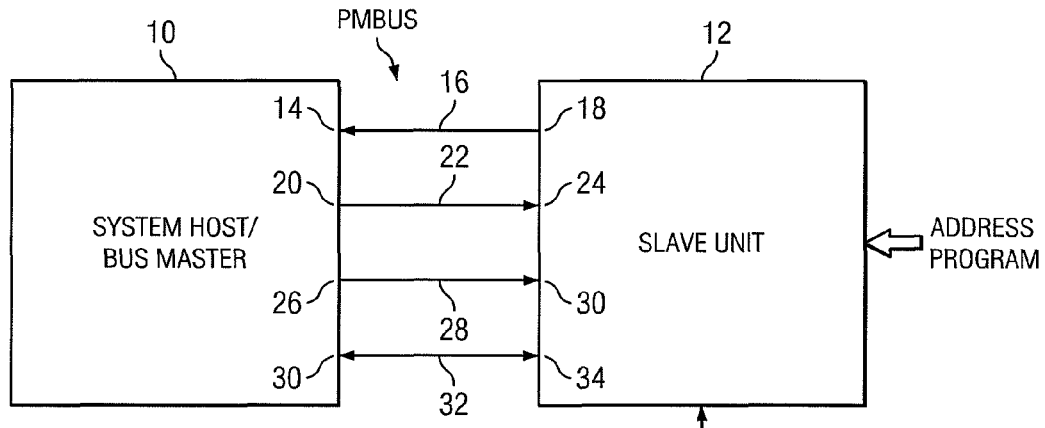
FIG. 1 is a block diagram of the interconnection of a system host/bus master with a slave unit through a Power Management Bus (PMBus)
Figure 2:
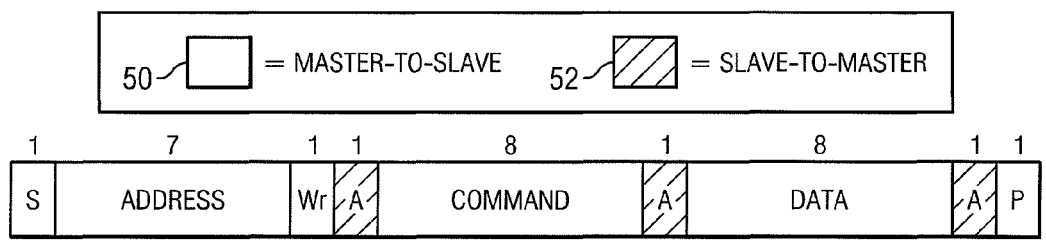
FIG. 2 shows an exemplary communication between the system host/bus master and the slave unit over a serial data bus.
Figure 3:
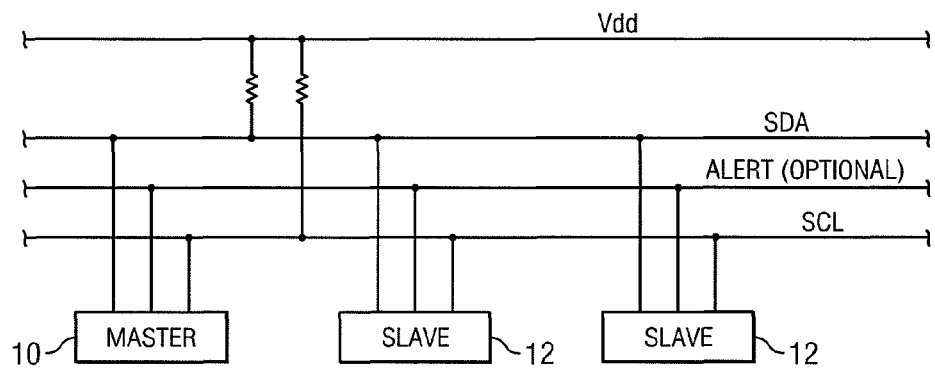
FIG. 3 illustrates a conventional I²C bus configuration with respect to a master device and several slave devices.
Figure 4:
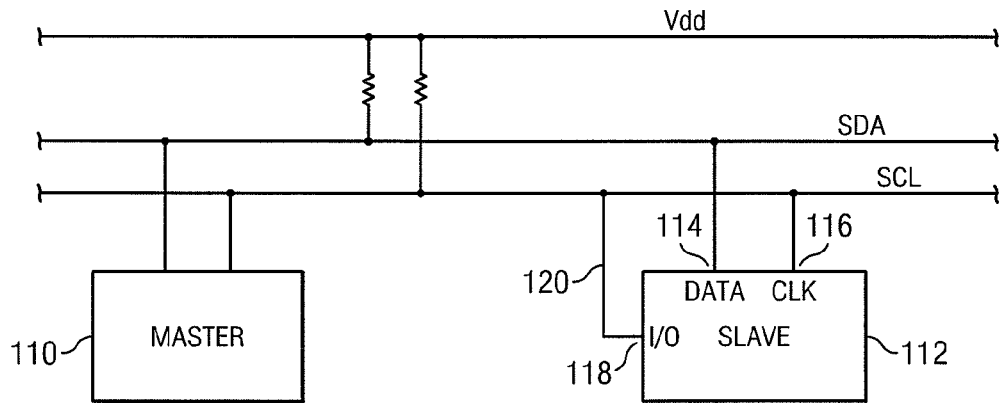
FIG. 4 illustrates an I²C bus configuration which supports slave-to-master notification of no support for an issued command.

Reference is now made to FIG. 4 which illustrates an I²C bus configuration which supports slave-to-master notification of no support for an issued command. The illustrated I²C bus configuration interconnects a master device 110 and at least one slave device 112. The I²C bus has a configuration well known to those skilled in the art to include two open-drain lines, the Serial Data (SDA) line and Serial Clock (SCL) line, pulled up with resistors to a supply voltage Vdd. In this context, each slave device 112 includes a bi-directional serial data input/output (DATA) 114 connected to the serial data line (SDA) and a clock input (CLK) 116 connected to the serial clock line (SCL).

The conventional I²C communication architecture is modified in FIG. 4 by providing each slave device 112 with an additional connection 120 to the serial clock line (SCL). This additional connection 120 is made by the slave device 112 through an additional serial data input/output (I/O) 118 (although it will be understood that just an additional external interrupt port could be used). The additional serial data input/output (I/O) 118 is selectively configured in the slave device 112 for use in input interrupt mode in a manner to be described so as to assist in detecting receipt of a command. As known to those skilled in the art, "input interrupt mode" refers to a mode of operation wherein a device immediately responds to an interrupt indication by executing the associated interrupt servicing program. More specifically, the "input interrupt mode" configuration detects a rising edge of the serial clock line (SCL), as received through the additional connection 120 and the additional serial data input/output (I/O) 118. Responsive to that rising clock edge, and the resulting signaled interrupt, the interrupt servicing program is executed in a manner to be described to capture command information communicated over the serial data line (SDA).

Figure 5:
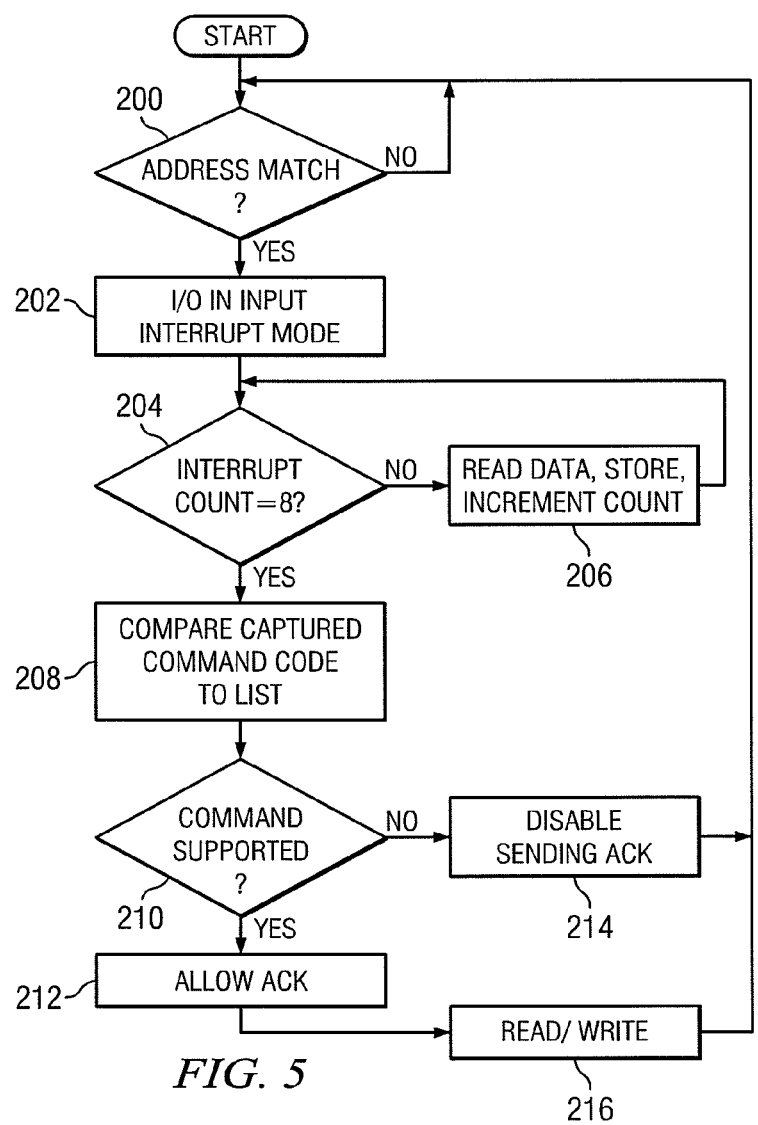
FIG. 5 is a flow diagram illustrating operation of the slave device.

Reference is now made to FIG. 5 which presents a flow diagram illustrating operation of the slave device 12. The slave device 12 first tests in step 200 for reception of a seven bit address in a master-to-slave communication on the serial data line (SDA) which matches the programmed address of that slave device. If a matching address is received in step 200, the slave device 112 configures its additional bi-directional serial data input/output (I/O) 118 in step 202 into input interrupt mode. In this mode, an interrupt signal is generated for each rising edge of the clock signal on the serial clock line (SCL). A test is then made is step 204 as to whether eight interrupts have been counted (one for each of eight consecutive rising clock edges). If not, with each interrupt the process moves to step 206 and the slave device 112 reads the data value present on the serial data line (SDA) at the bi-directional serial data input/output (I/O) 114 for the current clock edge, stores that read value in memory and increments the interrupt counter (i.e., the device executes the associated interrupt servicing program). Thus, the loop formed by steps 204 and 206 functions, after eight iterations and eight interrupt clock edges, to capture and store the subsequent eight bit command code sent by the master 110 to the slave device 112 over the serial data line (SDA) and received by the slave device 112 at the bi-directional serial data input/output (I/O) 114.

Once the interrupt count is satisfied in step 204, the captured and saved eight bit command code is compared in step 208 with a list of command codes that are supported by the slave device 112. A decision is made in step 210 as to whether the captured and saved eight bit command code is supported. If yes in step 210, the slave device 112 will, as is conventional practice in accordance with the I$^2$C bus protocol, send a one bit A signal indicating an acknowledgement (ACK) of receipt in step 212 (and operation thereafter continues in a normal manner with data read and/or write operations 216 using the serial data line (SDA) and the bi-directional serial data input/output (I/O) 114). In other words, the testing performed in steps 208 and 210 does not affect or change conventional I$^2$C bus protocol operation to send the acknowledgement (ACK) of command receipt by the slave device 112. This ACK is communicated by the slave device 112 operating to actively pull down (logic low) the serial data line (SDA) through the bi-directional serial data input/output (I/O) 114.

If no in step 210, this indicates that the captured and saved eight bit command code is not supported by the slave. In accordance with the conventional I$^2$C bus protocol (as discussed above), the slave device 112 would nonetheless typically send the acknowledgement (ACK) of command receipt. This would be a problem because, in the absence of the optional ALERT signal line in the I$^2$C bus configuration, there is no mechanism available for the slave device 112 to also indicate to the master 110 that the master's command code is not supported.

The process of FIG. 5, however, responds to the detection of a not supported command code (see step 210, path no) in step 214 by disabling the sending of (i.e., not allowing the slave device 112 to send) the conventional acknowledgment. It should be noted here that the I$^2$C bus protocol would, if not inhibited in some way by step 214, send a one bit A signal indicating an acknowledgement (ACK) of receipt even if the command was not supported. In other words, step 212 would nonetheless have been performed. However, because the received eight-bit command is not supported, step 214 controls the slave device 112 to preclude sending of the one bit A signal indicating an acknowledgement (ACK). The effect of this is, in essence, to cause the slave device 112 to instead send a one bit A(bar) signal (logic high due to the operation of the pull up resistor) indicating no acknowledgement (NACK) of receipt because the assertion of a logic low one bit A signal is inhibited. In this way, even though the I$^2$C bus protocol would not support sending of a NACK in response to receipt of a not supported command code, the serial data line (SDA) is nonetheless allowed to be pulled up at the proper time to a logic high NACK state.

Figure 6:
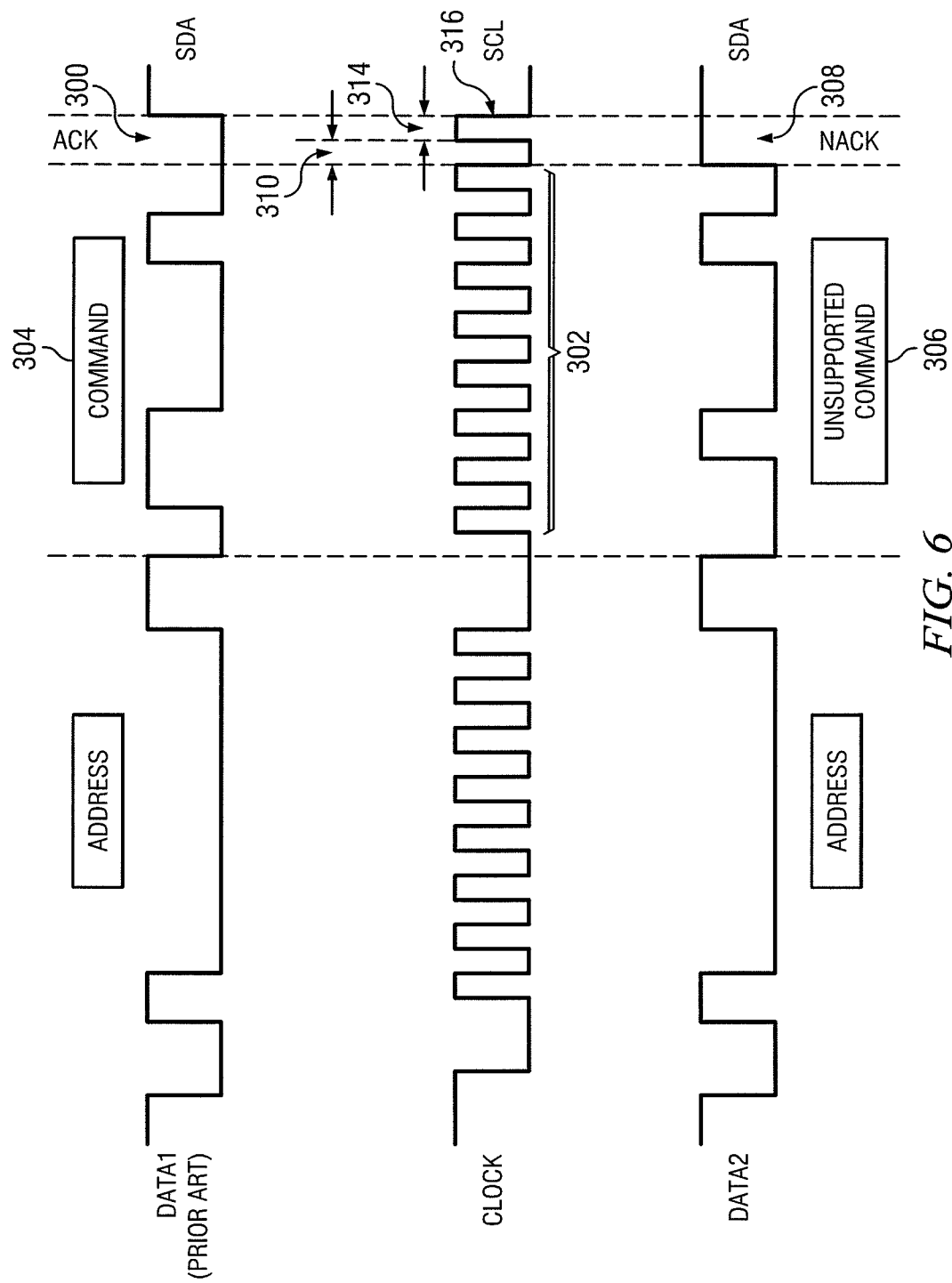
FIG. 6 are a set of timing diagrams comparing the conventional I²C bus protocol to operation in accordance with FIG. 5.

Reference is now made to FIG. 6 which shows a set of timing diagrams comparing the conventional I$^2$C bus protocol to operation in accordance with FIG. 5. The reference DATA1 refers to information on the serial data line (SDA) in connection with the conventional I$^2$C bus protocol. It will be noted that in such conventional operation, as indicated at reference 300, following receipt of a command code the slave device sends a one bit A (logic low) signal indicating an acknowledgement (ACK) of receipt regardless of whether that received command code is supported (FIG. 5, step 212). The reference DATA2 refers to information on the serial data line (SDA) in connection with the operation of FIG. 5 using the I$^2$C configuration of FIG. 4 with the additional connection 120 to the additional bi-directional serial data input/output (I/O) 118. Reference 302 indicates the eight clock cycles which are counted by the loop of FIG. 5 steps 204 and 206 to capture and store the command code. If the command code is a supported command code 304, then the slave device sends a one bit A (logic low) signal 300 indicating an acknowledgement (ACK) (FIG. 5, step 212) during the ninth clock cycle. However, if the command code is not a supported command code 306, this is detected by FIG. 5 steps 208 and 210 during the time period 310 and the slave device is inhibited in step 214 from sending a one bit A signal indicating an acknowledgement (ACK) during the ninth clock cycle. Rather, as the I$^2$C register is instructed to send a NACK, a one bit A(bar) (logic high) signal 308 is present on the serial data line (SDA) indicating no acknowledgement (NACK) and thus signifying to the master 110 that the command code 306 is not supported.

Figure 7:
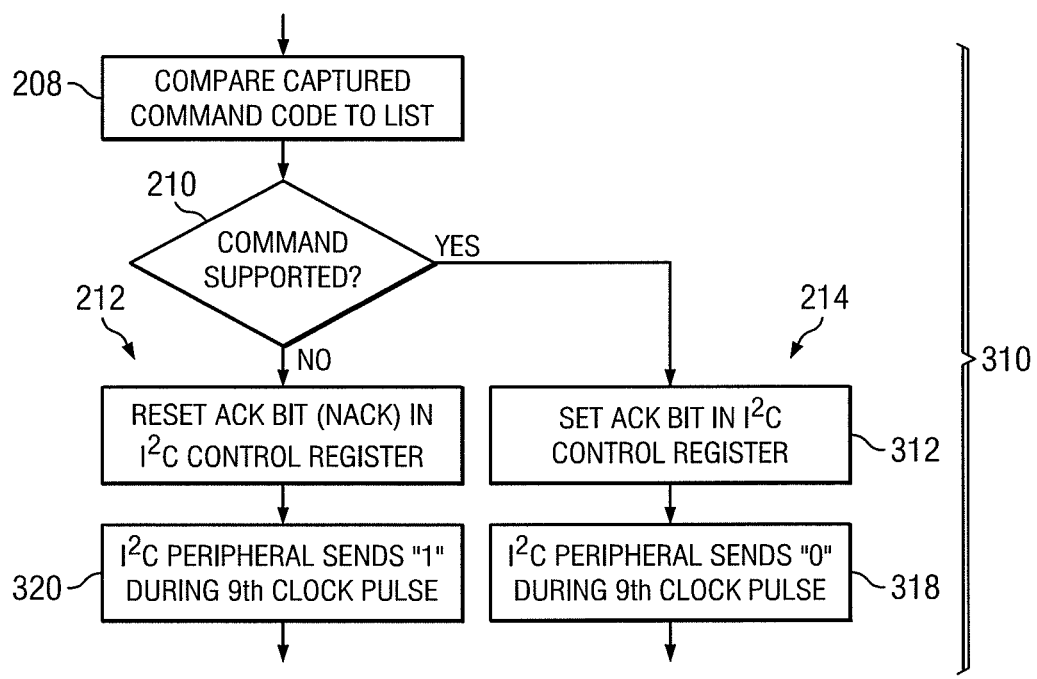
FIG. 7 is a flow diagram illustrating operation of the slave device during a time period for making an ACK/NACK decision.

Reference is now made to FIG. 7 which presents a flow diagram illustrating operation of the slave device 12 during the time period 310 for making an ACK/NACK decision. FIG. 7 presents additional details concerning the operations 208-214 of FIG. 5. At the beginning of the time period 310, the captured and saved eight bit command code is compared in step 208 with a list of command codes that are supported by the slave device 112. A decision is made in step 210 as to whether the captured and saved eight bit command code is supported. If yes in step 210, the slave device 112 will, in accordance with the I$^2$C bus protocol, set the ACK bit in the I$^2$C Control Register (CR) (step 312). Then, during the time period 314 (see, FIG. 6) of the ninth clock pulse 316, the slave device 112 as an I$^2$C peripheral will find the ACK bit set in the I$^2$C Control Register (CR) and send a logic "0" value 300 in step 318 on the data line (SDA). If no in step 210, the slave device 112 will, in accordance with the I$^2$C bus protocol, reset the ACK bit (NACK) in the I$^2$C Control Register (CR). Then, during the time period 314 (see, FIG. 6) of the ninth clock pulse 316, the slave device 112 as an I$^2$C peripheral will find the ACK bit reset (i.e., a NACK) in the I$^2$C Control Register (CR) and send a logic "1" value 308 in step 320 on the date line (SDA).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for use with an I$^2$C bus configuration, comprising:

receiving a clock signal at a clock input of a slave device coupled to a serial clock line of the I$^2$C bus configuration;

sensing edges of the clock signal at a bi-directional input/output port of a slave device coupled to the serial clock line of the I$^2$C bus configuration;

for every sensed edge, capturing by the slave device a command code present on a serial data line of the I²C bus configuration;

determining by the slave device whether the captured command code is one of plurality of slave device supported command codes;

if yes, the slave device driving the serial data line of the I²C bus configuration to a logic low state indicative of an acknowledgement of the command code; and if no, the slave device inhibiting driving of the serial data line of the I²C bus configuration to the logic low state so as to indicate a no acknowledgement of the command code.

2. The method of claim 1 further comprising:

triggering an interrupt in response to the clock signal received at the bi-directional input/output port; and capturing through the triggered interrupt individual bits of the command code received by the slave device on the serial data line of the I²C bus configuration.

3. The method of claim 2 further comprising:

determining that an address communicated over the serial data line of the I²C bus configuration matches an address assigned to the slave device; and enabling triggering of interrupts responsive to the clock signal received at the bi-directional input/output port if the addresses are determined to match.

4. A method for use with an I²C bus configuration, comprising:

(a) sensing an edge transition of a serial clock line of the I²C bus configuration using a first bi-directional input/output port of a slave device also having a clock input connected to the serial clock line;

(b) capturing on the sensed edge transitions a bit of a command code present on a serial data line of the I²C bus configuration using a second bi-directional input/output port of the slave device;

(c) repeating (a) and (b) until all bits of the command code are captured;

(d) determining whether the captured command code is one of plurality of slave device supported command codes;

(e1) if yes, the slave device sending an acknowledgement of the command code; and (e2) if no, the slave device inhibiting sending of the acknowledgement of the command code.

5. The method of claim 4 wherein (a) sensing the edge transition further comprises triggering of an interrupt servicing action to perform (b) capturing a bit of a command code.

6. The method of claim 5, wherein the first bi-directional input/output port comprises an interrupt port coupled to the serial clock line of the I²C bus configuration.

7. The method of claim 6 wherein the first bi-directional input/output port is an input/output port provided in addition to an input/output port which is coupled to the serial data line of the I²C bus configuration.

8. The method of claim 4 further comprising:

determining that an address communicated over the serial data line of the I²C bus configuration matches an assigned address; and enabling (a) sensing transition and (b) capturing a bit of a command code if the addresses are determined to match.

9. The method of claim 4 wherein:

(e1) sending an acknowledgement of the command code comprises: driving the serial data line of the I²C bus configuration to a logic low state indicative of an acknowledgement of the command code; and (e2) inhibiting sending of the acknowledgement of the command code comprises: inhibiting driving of the serial data line of the I²C bus configuration to the logic low state so as to indicate a no acknowledgement of the command code.

10. An apparatus, comprising:

a slave device having: an input/output adapted for connection to a serial data line of an I²C bus configuration; a clock input adapted for connection to a serial clock line of the I²C bus configuration; and a bi-directional interrupt input adapted for connection to the serial clock line of the I²C bus configuration;

wherein the slave device senses transitions on the serial clock line through the bi-directional interrupt input to trigger capturing of a command code on the serial data line through the input/output, the slave device further controlling the serial data line through the input/output to send an acknowledgement of receipt of the command code, the slave device still further inhibiting sending of the acknowledgement of the command code if the captured command code is not recognized.

11. The apparatus of claim 10 wherein:

sending an acknowledgement of the command code comprises: driving the serial data line of the I²C bus configuration to a logic low state indicative of the acknowledgement of the command code; and inhibiting sending of the acknowledgement of the command code comprises: inhibiting driving of the serial data line of the I²C bus configuration to the logic low state so as to indicate a no acknowledgement of the command code.

12. The apparatus of claim 11 wherein inhibiting driving of the serial data line comprises allowing the serial data line to be pulled up to a logic high state indicative of no acknowledgement of the command code.

13. An apparatus, comprising:

a slave device having:

(a) a first bi-directional input/output port adapted for connection to a serial data line of an I²C bus configuration, (b) a clock input adapted for connection to a serial clock line of the I²C bus configuration, and (c) a second bi-directional input/output port adapted for connection to the serial clock line of the I²C bus configuration, wherein the slave device is configured to:

(i) sense rising edges of the serial clock line through the second bi-directional input/output port, (ii) for every sensed rising edge, capture a command code on the serial data line through the first bi-directional input/output, (iii) trigger sending of an acknowledgement signal through the serial data line when the command code is recognized by the slave device, and (iv) trigger sending of a no acknowledgement signal through the serial data line when the command code is not recognized by the slave device.

14. The apparatus of claim 13, wherein the slave device is configured to trigger sending either the acknowledgement or no acknowledgement signal before a ninth clock cycle beginning upon receipt of a first bit of the command code.

15. The apparatus of claim 13, wherein the slave device is configured to trigger the acknowledgement signal by driving of the serial data line of the I²C bus configuration to a logic low state.

16. The apparatus of claim 13, wherein the slave device is configured to trigger the no acknowledgement signal by driving of the serial data line of the I²C bus configuration to a logic low state.

17. The apparatus of claim 13, wherein both the first and second bi-directional input/output ports are capable of sending and receiving electrical signals.

18. The apparatus of claim 13, wherein when the slave device is configured to trigger sending the acknowledgement signal, the slave device additionally sends a logic "0" value across the serial data line.

19. The apparatus of claim 13, wherein when the slave device is configured to trigger sending the no acknowledgement signal by resetting an ACK bit to a different value.

* * * * *